(12) United States Patent
Gassert et al.

(10) Patent No.: US 10,610,959 B2
(45) Date of Patent: Apr. 7, 2020

(54) ULTRASONIC WELDING TONGS

(71) Applicant: SCHUNK SONOSYSTEMS GMBH, Wettenberg (DE)

(72) Inventors: Frank Gassert, Bischoffen (DE); Peter Quillmann, Lahnau (DE); Udo Wagenbach, Buseck (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 270 days.

(21) Appl. No.: 15/561,540

(22) PCT Filed: Apr. 8, 2016

(86) PCT No.: PCT/EP2016/057689
§ 371 (c)(1),
(2) Date: Sep. 26, 2017

(87) PCT Pub. No.: WO2016/166019
PCT Pub. Date: Oct. 20, 2016

(65) Prior Publication Data
US 2018/0079027 A1     Mar. 22, 2018

(30) Foreign Application Priority Data
Apr. 16, 2015   (DE) .................. 10 2015 206 866

(51) Int. Cl.
*B23K 20/10* (2006.01)
*B23K 37/00* (2006.01)
(Continued)

(52) U.S. Cl.
CPC .......... *B23K 20/106* (2013.01); *B23K 37/006* (2013.01); *B23K 37/04* (2013.01);
(Continued)

(58) Field of Classification Search
None
See application file for complete search history.

(56) References Cited

U.S. PATENT DOCUMENTS 2,304,975 A * 12/1942 Warrender ............. B23K 11/31
219/90
3,632,943 A *  1/1972 Engler ................... B23K 13/00
219/633

(Continued)

FOREIGN PATENT DOCUMENTS

| CN | 101543936 A | 9/2009 |
| CN | 201455542 U | 5/2010 |

(Continued)

*Primary Examiner* — Devang R Patel
(74) *Attorney, Agent, or Firm* — King & Schickli, PLLC

(57) ABSTRACT

The invention relates to ultrasonic welding tongs (10) for performing ultrasonic welding on a tubular electrically conductive welding medium (20), wherein a first welding jaw or a second welding jaw and a welding-medium stop device (21), which delimits a welding-medium holding space (19) formed between the welding jaws, are each electrically conductive and arranged electrically isolated from each other, the electrically conductive welding jaw and the electrically conductive welding-medium stop device forming components of a safety circuit in such a manner that a welding process including a closing of the welding jaws is triggered after the safety circuit has been closed by the formation of an electrical contact between the electrically conductive welding jaw and the welding-medium stop device by way of the welding medium.

5 Claims, 2 Drawing Sheets

(51) Int. Cl.
*B23K 37/04* (2006.01)
*B23K 101/06* (2006.01)
*B23K 103/04* (2006.01)
*B23K 103/12* (2006.01)

(52) U.S. Cl.
CPC ...... *B23K 2101/06* (2018.08); *B23K 2103/04* (2018.08); *B23K 2103/12* (2018.08)

(56) References Cited

U.S. PATENT DOCUMENTS

| | | | | |
|---|---|---|---|---|
| 3,813,021 | A | * | 5/1974 | Kramer .................. B23K 20/10 228/1.1 |
| 4,656,327 | A | * | 4/1987 | Wilcox ................ B23K 11/314 219/86.21 |
| 4,842,671 | A | * | 6/1989 | Nuss .................... B23K 20/106 156/433 |
| 5,223,686 | A | * | 6/1993 | Benway ............... B23K 9/0286 219/60 A |
| 6,049,046 | A | * | 4/2000 | Newland .............. H01H 1/0231 200/262 |
| 6,136,118 | A | * | 10/2000 | Bartholomew ....... B65B 13/327 100/33 PB |
| 7,523,489 | B2 | * | 4/2009 | Bossemeyer .......... G06Q 20/02 705/65 |
| 2010/0005981 | A1 | | 1/2010 | Patrikios et al. |

FOREIGN PATENT DOCUMENTS

| | | | |
|---|---|---|---|
| DE | 3316873 | 11/1984 | |
| DE | 3710603 | 3/1987 | |
| DE | 19735195 | 1/1999 | |
| JP | 2003062675 A | 3/2003 | |
| JP | 2012030283 | 2/2012 | |
| WO | WO2005107994 | 11/2005 | |
| WO | WO-2005107994 A2 * | 11/2005 | ............ B23K 20/10 |
| WO | WO2014122516 | 8/2014 | |

* cited by examiner

ULTRASONIC WELDING TONGS

FIELD OF THE INVENTION

The present invention relates to ultrasonic welding tongs for performing ultrasonic welding on a tubular electrically conductive welding medium, comprising a first tongs part and a second tongs part movable relative to the first tongs part, the first tongs part having a first welding jaw, which is formed by a sonotrode, which transmits ultrasonic vibrations, and the second tongs part having a second welding jaw, which is formed by an anvil.

BACKGROUND OF THE INVENTION

Ultrasonic welding tongs of the kind mentioned above are used in particular for the welding of ends on metallic pipes, such as fluid lines on cooling units, i.e. in particular in air conditioners or refrigerators, for example. This type of welding of ends is performed after a cooling circuit comprising the fluid lines has been filled with a coolant, in such a manner that a filling armature arranged on a free end of the pipe is severed from the pipe end at the same time as said end is being welded.

Although the actual welding process takes place between the welding jaws, which are relatively small and narrow and which, owing to their narrow and small design, allow positioning in the welding position even in the most constricted of spaces in order to also be able to perform the welding process very closely to the unit equipped with the fluid line, the arrangement of the ultrasonic device comprising the sonotrode on a tongs part of the ultrasonic welding tongs requires an overall large-volume design of the ultrasonic welding tongs including a corresponding mass. Hence, for handling of the ultrasonic welding tongs, the ultrasonic welding tongs have to be combined with a handling device so as to compensate the weight of the ultrasonic welding tongs and to thus facilitate handling of the ultrasonic welding tongs.

Although the known ultrasonic welding tongs are provided with a handling device of this kind, thus being easy to position using only one hand, the known ultrasonic welding tongs are supposed to be operated using two hands for safety reasons. This is to ensure that no hand of the operator is located in the area of the welding jaws during performance of the welding process. For two-hand operation, two trigger switches for triggering the welding process are provided, each of which is arranged on one handle, both hands of the operator thus having to be placed on spaced-apart handles in order to perform or trigger the welding process.

Hence, in practice, welding the ends of a tubular fluid line of a cooling unit requires particular skill of the operator because simultaneously to the welding process, he or she has to ensure that the filling armature, which will be severed from the fluid line when the ends are welded, is positioned in a desired location and will in particular not be damaged when dropping into a receiving container.

SUMMARY OF THE INVENTION

The object of the present invention is to simplify handling of ultrasonic welding tongs without any adverse effects on the operational safety of the ultrasonic welding tongs.

This object is attained by the ultrasonic welding tongs having the features of claim 1.

According to the invention, the first welding jaw or the second welding jaw and a welding-medium stop device, which delimits a welding-medium holding space formed between the welding jaws, are each electrically conductive and arranged electrically isolated from each other, the electrically conductive welding jaw and the electrically conductive welding-medium stop device forming components of a safety circuit in such a manner that a welding process including a closing of the welding jaws is triggered after the safety circuit has been closed by the formation of an electrical contact between the electrically conductive welding jaw and the welding-medium stop device by way of the welding medium.

The ultrasonic welding tongs according to the invention thus allow a welding process to be triggered only if an electrical contact is formed between the welding-medium stop device and the electrically conductive welding jaw by way of the welding medium arranged as a bridging contact between the welding jaw and the welding-medium stop device. In this way, the welding medium itself forms a component of a trigger device for triggering the welding process.

Owing to the design of the ultrasonic welding tongs according to the invention, two-hand operation of the ultrasonic welding tongs is no longer required in order to ensure that a closing of the welding jaws followed by a welding process will actually take place only if the simultaneous contact between the welding medium and the electrically conductive welding jaw and the welding-medium stop device ensures that the welding medium is in the welding position. In this way, it is possible for the ultrasonic welding tongs to be intended for safe-to-operate one-hand operation in such a manner that in particular only one hand is needed on the ultrasonic welding tongs in order to handle it.

Since the handling device typically combined with the ultrasonic welding tongs provides weight relief anyway, the operator only has to position the ultrasonic welding tongs relative to the welding medium by pivoting the ultrasonic welding tongs in such a manner that the welding medium is located in the welding-medium holding space between the welding jaws. This pivoting positioning of the ultrasonic welding tongs can be easily performed with one hand, the operator thus being able to take hold of the filling armature with the free hand during welding so as to ensure its correct positioning once it is severed from the welding medium.

In a preferred embodiment of the ultrasonic welding tongs, the welding-medium stop device is connected to one tongs part via a connecting element realized as an isolating body, the desired electrical isolation thus being realized owing to the connecting body itself, i.e. to a connecting means necessary anyway in order to connect the connecting element to the respective tongs part, for example.

It is particularly advantageous for the welding-medium stop device to be arranged on the first tongs part and for the electrically conductive welding jaw to be arranged on the second tongs part so that the mobility of the second tongs parts relative to the first tongs part is not adversely affected.

If the welding-medium stop device has two stop elements that are electrically isolated from each other and arranged in a shared stop plane parallel to a longitudinal axis direction of the welding medium, said longitudinal axis direction being defined for the performance of the welding process, the stop device can be used in a particularly advantageous fashion not only in connection with a safe triggering of the welding process but also to ensure a defined positioning of the welding medium because in this case triggering of the welding process can additionally be made conditional on an electrically conductive connection being established between the mutually isolated stop elements via the welding medium.

The stop elements are arranged in a particularly advantageous fashion if the stop elements are arranged on the first tongs part in such a manner that free contact ends of the stop elements accommodate between them the welding jaw formed by the anvil at the lower tongs part.

Hereinafter, an advantageous embodiment of the ultrasonic welding tongs is explained in more detail with the aid of the drawing.

BRIEF DESCRIPTION OF THE DRAWING FIGURES

DETAILED DESCRIPTION OF THE INVENTION

Figure 1:
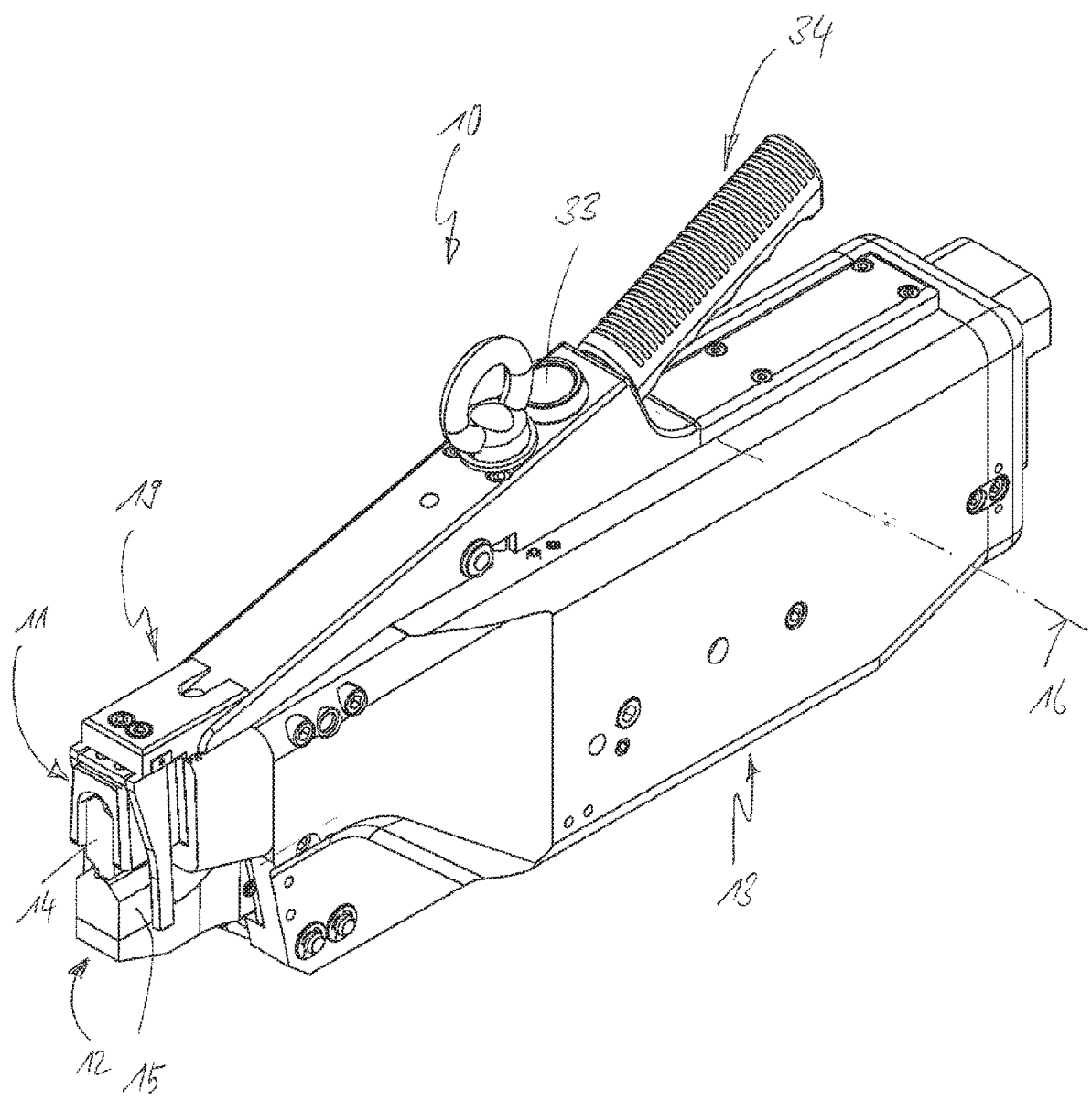
FIG. 1 shows an isometric illustration of ultrasonic welding tongs with welding jaws being in the closed position and arranged in a tongs head.

FIG. 1 shows an isometric illustration of ultrasonic welding tongs 10 having an upper tongs part 11 and a lower tongs part 12, which are arranged in a shared tongs housing 13. The upper tongs part 11 has an ultrasonic vibration device as the substantial component, comprising a sonotrode 14 arranged at the front end of the ultrasonic vibration device, said sonotrode 14 forming a first welding jaw. An anvil 15 is mounted on the tongs housing 13 so as to be movable relative to the sonotrode 14. In the case of the illustrated embodiment example, the anvil 15, which forms a second welding jaw, can be pivoted against the sonotrode 14 about a pivot axis 16, which is formed in the rear portion of the tongs housing 13, by means of an actuating device (not illustrated) in such a manner that a counter surface 17 formed on the anvil 15 is moved against a working surface 18 of the sonotrode 14, which performs longitudinal vibrations in the case at hand. Alternatively, an advancing movement of the anvil 15 in the direction toward the sonotrode 14 can also take place by means of a linear adjusting device.

Figure 2:
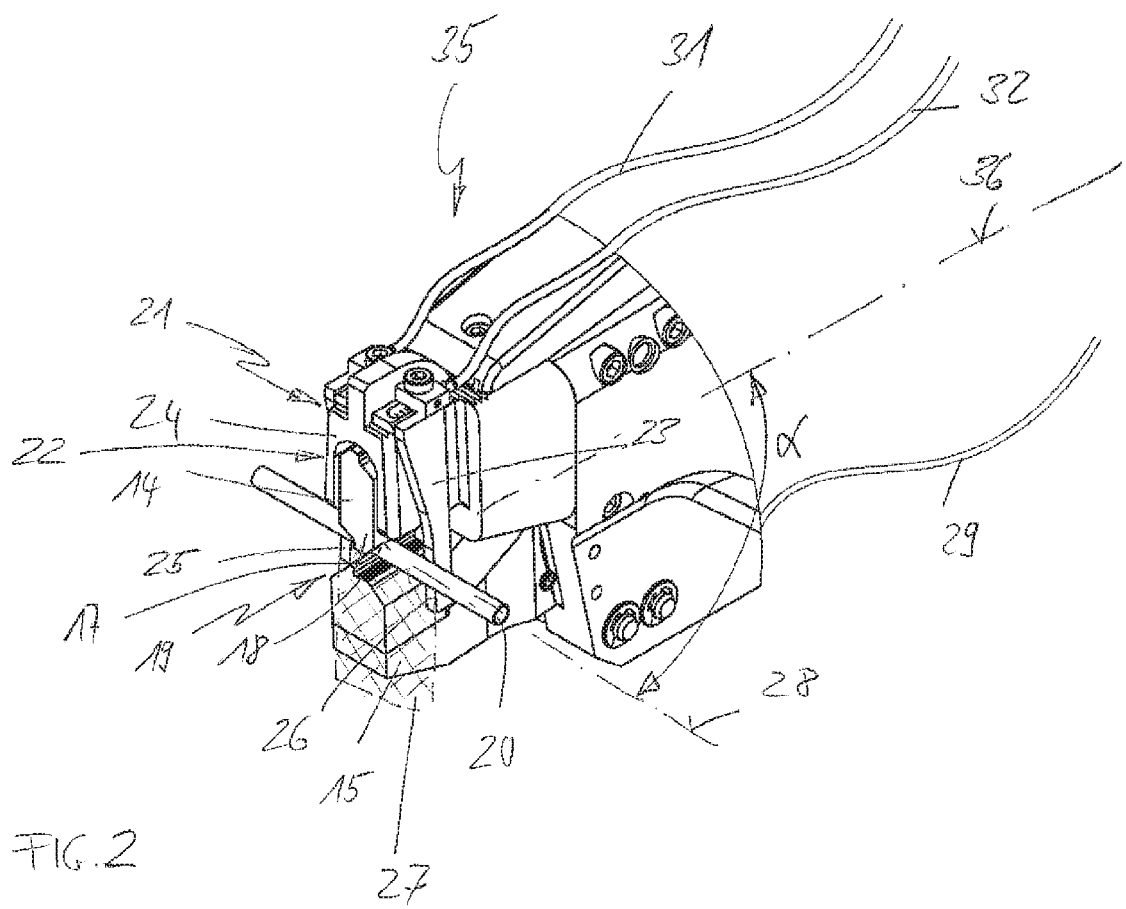
FIG. 2 shows an illustration of a tongs head with welding jaws being arranged in the open position.

The sonotrode 14 and the anvil 15 substantially form a welding head 35 of the ultrasonic welding tongs 10 and, in an open position of the welding head 35 as illustrated in FIG. 2, delimit a welding-medium holding space 19, into which a welding medium 20 can be inserted, which is formed as a small metal tube in the case at hand. As can further be seen in FIG. 2, the upper tongs part 11 is provided with a welding-medium stop device 21, which has two spaced-apart stop elements 22, 23, which are connected to the upper tongs part 11 via an isolating body 24. Free contact ends 25, 26 of the stop elements 22, 23 extend in a shared stop plane 27 at both sides of the anvil 15 in such a manner that when the welding medium 20 inserted into the welding-medium holding space 19 comes into contact with the contact ends 25, 26, the welding medium 20 has reached a longitudinal axis orientation 28, which is illustrated in FIG. 2 and which ensures that a weld seam produced after performance of a closing process of the welding jaws extends in the direction of a longitudinal axis 36 of the ultrasonic welding tongs 10, i.e. substantially at an angle $\alpha=90°$ to the longitudinal axis orientation 28 of the welding medium.

In the embodiment illustrated in FIG. 2, the electrically conductive anvil 15 is connected to the housing 13, which is also electrically conductive and which forms an electrical ground potential and which is grounded via a grounding conductor 29.

The stop elements 22, 23, which are also electrically conductive, are electrically isolated from the housing 13 and from each other by being arranged on the isolating body 24 and are each connected to an evaluating unit (not illustrated) via a signal conductor 31, 32, which are arranged in a safety circuit together with the anvil 15 and the stop elements 22, 23, an actuating switch 33 arranged on a handle 34 of the ultrasonic welding tongs 10 in FIG. 1 being integrated into said safety circuit, as well.

The structure of the welding head 35, illustrated in FIG. 2 and comprising the mutually isolated stop elements 22, 23 and the anvil 15, ensures that in order for the safety circuit to close, both the actuating switch 33 on the handle 34 has to be actuated and an electrical contact has to be established between the anvil 15 and the two stop elements 22, 23 via the welding medium 20. Only if these two conditions are met does the safety circuit close, and the welding jaws are closed by a pivoting of the anvil 15 against the sonotrode 14 as a prerequisite for the performance of the welding process.

The invention claimed is:

1. Ultrasonic welding tongs (10) for performing ultrasonic welding on a tubular electrically conductive welding medium (20), comprising a first tongs part (11) and a second tongs part (12) movable relative to the first tongs part, the first tongs part having a first welding jaw, which is formed by a sonotrode (14), which transmits ultrasonic vibrations, and the second tongs part having a second welding jaw, which is formed by an anvil (15), characterized in that the first welding jaw or the second welding jaw and a welding-medium stop device (21), which delimits a welding-medium holding space (19) formed between the first and second welding jaws, are each electrically conductive and arranged electrically isolated from each other, the electrically conductive welding jaw and the electrically conductive welding-medium stop device forming components of a safety circuit in such a manner that a welding process including a closing of the first and second welding jaws is triggered after the safety circuit has been closed by the formation of an electrical contact between the electrically conductive welding jaw and the welding-medium stop device by way of the tubular electrically conductive welding medium.

2. The ultrasonic welding tongs according to claim 1, characterized in that the welding-medium stop device (21) is connected to a tongs part via a connecting element realized as an isolating body (24).

3. The ultrasonic welding tongs according to claim 1, characterized in that the welding-medium stop device (21) is arranged on the first tongs part (11) and the electrically conductive welding jaw is arranged on the second tongs part (12).

4. The ultrasonic welding tongs according to claim 1, characterized in that the welding-medium stop device (21) has two stop elements (22, 23), which are electrically isolated from each other and which are arranged in a shared stop plane (27) parallel to a longitudinal axis orientation (36) of the tubular electrically conductive welding medium (20), said longitudinal axis orientation being defined for the performance of the welding process.

5. The ultrasonic welding tongs according to claim 4, characterized in that the stop elements (22, 23) are arranged on the first tongs part (11) in such a manner that free contact ends (25, 26) of the stop elements accommodate between them the welding jaw formed by the anvil (15) at the lower tongs part (12).

\* \* \* \* \*